United States Patent
Sohn et al.

(10) Patent No.: US 11,535,711 B2
(45) Date of Patent: Dec. 27, 2022

(54) POLY(AMIDE-IMIDE) COPOLYMER, COMPOSITION FOR PREPARING SAME, ARTICLE INCLUDING SAME, AND DISPLAY DEVICE INCLUDING THE ARTICLE

(71) Applicants: SAMSUNG ELECTRONICS CO., LTD., Suwon-si (KR); SAMSUNG SDI CO., LTD., Yongin-si (KR)

(72) Inventors: Byunghee Sohn, Yongin-si (KR); Sungwon Choi, Hwaseong-si (KR); Sun Jin Song, Seoul (KR); Chanjae Ahn, Suwon-si (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 385 days.

(21) Appl. No.: 16/891,328

(22) Filed: Jun. 3, 2020

(65) Prior Publication Data
US 2020/0385524 A1 Dec. 10, 2020

(30) Foreign Application Priority Data
Jun. 4, 2019 (KR) .................. 10-2019-0066243

(51) Int. Cl.
C08G 73/14 (2006.01)
C08L 79/08 (2006.01)
C09D 179/08 (2006.01)

(52) U.S. Cl.
CPC ............. *C08G 73/14* (2013.01); *C08L 79/08* (2013.01); *C09D 179/08* (2013.01); *C08J 2379/08* (2013.01)

(58) Field of Classification Search
CPC ....... C08L 79/08; C09D 179/08; C08G 73/14; C08J 2379/08
See application file for complete search history.

(56) References Cited

U.S. PATENT DOCUMENTS

2019/0292138 A1* 9/2019 Yun .................. C07C 231/02

FOREIGN PATENT DOCUMENTS

| DE | 2416811 | * | 10/1975 |
|---|---|---|---|
| JP | 2003080630 A | | 3/2003 |
| JP | 2003212996 A | | 7/2003 |
| JP | WO 2013144992 | * | 10/2013 |
| KR | 100655766 B1 | | 12/2006 |
| KR | 1020150141029 B1 | | 12/2015 |
| KR | 101809990 B1 | | 12/2017 |
| KR | 1020180022217 A | | 3/2018 |
| KR | 1020180023368 B1 | | 3/2018 |

OTHER PUBLICATIONS

USPTO search report, dated Aug. 2022.*
Masatoshi Hasegawa, et al., Colorless polyimides with low coefficient of thermal expansion derived from alkyl-substituted cyclobutanetetracarboxylic dianhydrides, Polym Int 2014; 63: 486-500.

* cited by examiner

*Primary Examiner* — Gregory Listvoyb
(74) *Attorney, Agent, or Firm* — Cantor Colburn LLP

(57) ABSTRACT

A poly(amide-imide) copolymer that is a reaction product of a diamine represented by Chemical Formula 1, a tetracarboxylic acid dianhydride including a compound represented by Chemical Formula 2, and a compound represented by Chemical Formula 3:

Chemical Formula 1

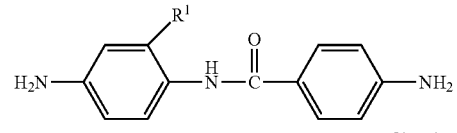

Chemical Formula 2

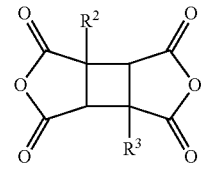

Chemical Formula 3

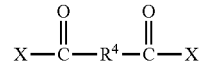

Chemical Formula 4

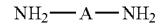

wherein, in Chemical Formulae 1 to 4, $R^1$ to $R^4$, A, and X are the same as defined in the specification.

20 Claims, No Drawings

POLY(AMIDE-IMIDE) COPOLYMER, COMPOSITION FOR PREPARING SAME, ARTICLE INCLUDING SAME, AND DISPLAY DEVICE INCLUDING THE ARTICLE

CROSS-REFERENCE TO RELATED APPLICATION

This application claims priority to Korean Patent Application No. 10-2019-0066243, filed on Jun. 4, 2019, and all the benefits accruing therefrom under 35 U.S.C. § 119, the content of which is incorporated herein by reference in its entirety.

BACKGROUND

1. Field

This disclosure relates to a poly(amide-imide) copolymer, a composition for preparing a poly(amide-imide) copolymer, an article including a poly(amide-imide) copolymer, and to a display device including the article.

2. Description of the Related Art

A flexible display that is thin and flexible, ultra-light, and consumes a small amount of electricity, has been increasingly in demand for visualizing and delivering various forms of information to users. The flexible display may be realized by using a flexible substrate, organic and inorganic materials designed for low temperature manufacturing processes, flexible electronics, encapsulation, packaging, or the like.

A flexible display will require a protective, transparent plastic film for replacing a conventional window cover glass. Moreover, the transparent plastic film or window desirably has high toughness and excellent optical properties. Desired optical properties include high light transmittance, low haze, low yellowness index, low refractive index, or the like. Desired mechanical properties include high tensile modulus, high surface hardness, toughness, or the like.

SUMMARY

An embodiment provides a poly(amide-imide) copolymer having improved optical and mechanical properties.

Another embodiment provides a composition for preparing the poly(amide-imide) copolymer.

Still another embodiment provides an article including the poly(amide-imide) copolymer, the article having improved optical and mechanical properties.

Yet another embodiment provides a display device including the article including the poly(amide-imide) copolymer.

According to an embodiment, provided is a poly(amide-imide) copolymer that is a reaction product of; a diamine represented by Chemical Formula 1, a tetracarboxylic acid dianhydride including a compound represented by Chemical Formula 2, and a compound represented by Chemical Formula 3:

Chemical Formula 1

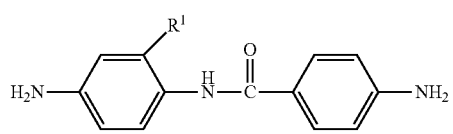

wherein in Chemical Formula 1,
$R^1$ is a halogen-substituted C1 to C10 alkyl group;

Chemical Formula 2

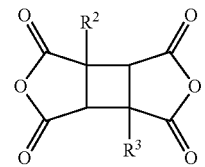

wherein in Chemical Formula 2,
$R^2$ and $R^3$ are each independently hydrogen, or an unsubstituted or a halogen-substituted C1 to C10 alkyl group;

Chemical Formula 3

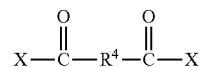

wherein, in Chemical Formula 3,
$R^4$ is a substituted or unsubstituted phenylene group or a substituted or unsubstituted biphenylene group, and
each X is an identical or a different halogen atom.

The diamine may further include a compound represented by Chemical Formula 4:

$$NH_2\text{-}A\text{-}NH_2 \quad \text{Chemical Formula 4}$$

wherein in Chemical Formula 4,
A is a ring system including two or more C6 to C30 aromatic rings linked by a single bond, wherein each of the two or more aromatic rings is independently unsubstituted or substituted with an electron-withdrawing group.

The tetracarboxylic acid dianhydride may further include a compound represented by Chemical Formula 5:

Chemical Formula 5

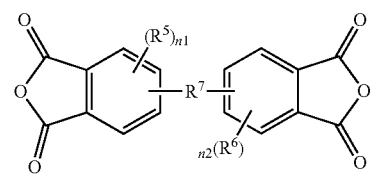

wherein, in Chemical Formula 5,
$R^5$ and $R^6$ are each independently a halogen, a hydroxy group, a substituted or unsubstituted C1 to C10 aliphatic organic group, a substituted or unsubstituted C6 to C20 aromatic organic group, a group of formula $-OR^{201}$, wherein $R^{201}$ is a C1 to C10 aliphatic organic group, or a silyl group of formula $-SiR^{210}R^{211}R^{212}$, wherein $R^{210}$, $R^{211}$, and $R^{212}$ are each independently hydrogen or a C1 to C10 aliphatic organic group, and
$R^7$ is a single bond, $-O-$, $-S-$, $-C(=O)-$, $-CH(OH)-$, $-C(=O)NH-$, $-S(=O)_2-$, $-Si(CH_3)_2-$, $-(CH_2)_p-$, $-(CF_2)_q-$, $-C(C_nH_{2n+1})_2-$, $-C(CnF_{2n+1})_2-$, $-(CH_2)_pC(C_nH_{2n+1})_2(CH_2)_q-$, or $-(CH_2)_pC(C_nF_{2n+1})_2(CH_2)_q-$ wherein $1 \leq n \leq 10$, $1 \leq p \leq 10$, and $1 \leq q \leq 10$,
$n1$ and $n2$ are each independently an integer ranging from 0 to 3.

In Chemical Formula 1, $R^1$ may be a fluoro-substituted C1 to C4 alkyl group.

In Chemical Formula 2, $R^2$ and $R^3$ may each independently be hydrogen, or a fluoro-substituted or unsubstituted C1 to C4 alkyl group.

In Chemical Formula 4, A may be a ring system including two C6 to C14 aromatic rings linked by a single bond, wherein each of the two or more aromatic rings may independently be substituted with a halogen atom, a nitro group, a cyano group, a C1- or C2-haloalkyl group, a C2- to C6-alkanoyl group, or a C2 to C6 acyloxy group.

The compound represented by Chemical Formula 4 may be represented by one or more of the following chemical formulae:

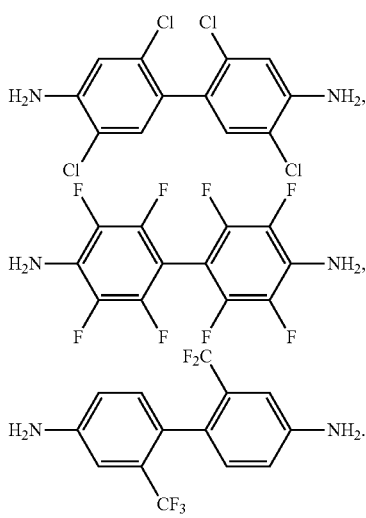

In Chemical Formula 5,
n1 and n2 may both be 0 (zero), and
R7 may be —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10).

In Chemical Formula 5,
n1 and n2 may both be 0 (zero), and
R7 may be —O—, —S—, —C(=)—, —CH(OH)—, —C(=O)NH—, —S(=O)$_2$—, or —C(C$_n$F$_{2n+1}$)$_2$ (wherein 1≤n≤3).

in Chemical Formula 3,
$R^4$ may be an unsubstituted phenylene group, and each X may be chloro atom (Cl).

The compound represented by Chemical Formula 1 may be included in an amount of less than or equal to about 55 mole percent (mol %) based on a total mole number of the diamine.

The compound represented by Chemical Formula 2 may be included in an amount of greater than or equal to about 30 mol % and less than or equal to about 70 mol % based on a total mole number of tetracarboxylic acid dianhydride.

The tetracarboxylic acid dianhydride may be included in an amount of greater than or equal to about 25 mol % and less than or equal to about 90 mol % based on a total mole number of the tetracarboxylic acid dianhydride and the compound represented by Chemical Formula 3.

According to an embodiment, provided is a composition for preparing a poly(amide-imide) copolymer including a compound represented by Chemical Formula 1, a compound represented by Chemical Formula 2, and a compound represented by Chemical Formula 6:

Chemical Formula 1

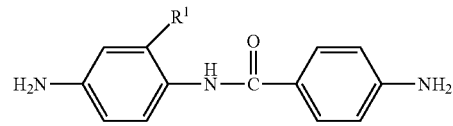

wherein in Chemical Formula 1,
$R^1$ is a halogen-substituted C1 to C10 alkyl group;

Chemical Formula 2

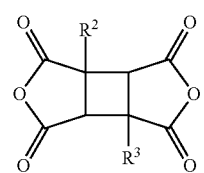

wherein in Chemical Formula 2,
$R^2$ and $R^3$ are each independently hydrogen, or an unsubstituted or a halogen-substituted C1 to C10 alkyl group;

Chemical Formula 6

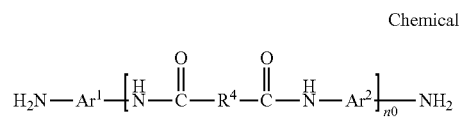

wherein, in Chemical Formula 6,
n0 is an integer of greater than or equal to 1, or greater than 1 and less than 20, or preferably, greater than 1 and less than 10.

$R^4$ is a substituted or unsubstituted phenylene group or a substituted or unsubstituted biphenylene group, and $Ar^1$ and $Ar^2$ are, each independently, represented by Chemical Formula 7:

Chemical Formula 7

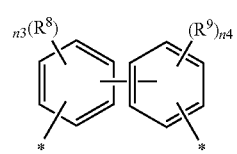

wherein, in Chemical Formula 7,
$R^8$ and $R^9$ are each independently —CF$_3$, —CCl$_3$, —CBr$_3$, —Cl$_3$, —NO$_2$, —CN, —C(=O)CH$_3$, and —CO$_2$C$_2$H$_5$, n3 and n4 are each independently an integer ranging from 1 to 4.

The composition may further include a compound represented by Chemical Formula 5:

Chemical Formula 5

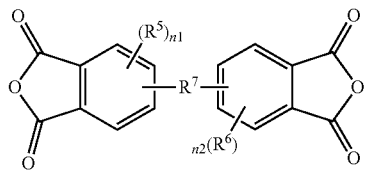

wherein, in Chemical Formula 5, $R^5$ and $R^6$ are each independently a halogen, a hydroxy group, a substituted or unsubstituted C1 to C10 aliphatic organic group, a substituted or unsubstituted C6 to C20 aromatic organic group, a group of formula —$OR^{201}$, wherein $R^{201}$ is a C1 to C10 aliphatic organic group, or a silyl group of formula —$SiR^{210}R^{211}R^{212}$, wherein $R^{210}$, $R^{211}$, and $R^{212}$ are each independently hydrogen or a C1 to C10 aliphatic organic group, and $R^7$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, n1 and n2 are each independently an integer ranging from 0 to 3.

The composition may further include a compound represented by Chemical Formula 4:

$NH_2$-A-$NH_2$  Chemical Formula 4 wherein in Chemical Formula 4,

A is a ring system including two C6 to C30 aromatic rings linked by a single bond, wherein the two C6 to C30 aromatic rings is independently substituted with a halogen atom, a nitro group, a cyano group, a C1- or C2-haloalkyl group, a C2- to C6-alkanoyl group, or a C2 to C6 acyloxy group.

In the composition, $R^1$ of Chemical Formula 1 is a fluoro-substituted C1 to C4 alkyl group, $R^2$ and $R^3$ of Chemical Formula 2 are each independently hydrogen, or a fluoro-substituted or unsubstituted C1 to C4 alkyl group, n1 and n2 of Chemical Formula 5 are both 0, $R^7$ is —O—, —S—, —C(=O)—, —CH(OH)—, —C(=O)NH—, —S(=O)$_2$—, or —C(C$_n$F$_{2n+1}$)$_2$— wherein, 1≤n≤3, $R^4$ of Chemical Formula 6 is an unsubstituted phenylene group, $R^8$ and $R^9$ of Chemical Formula 7 are each independently —$CF_3$ or —$CCl_3$, and n3 and n4 are each 1, or independently 1 or 2.

According to another embodiment, provided is an article including a poly(amide-imide) copolymer according to an embodiment, or a poly(amide-imide) copolymer prepared from a composition for preparing the same according to another embodiment.

The article may be a film, wherein the film may have a tensile modulus of greater than or equal to 5 GPa, as measured according to ASTM D882, and a refractive index of less than 1.7, measured by using an Ellipsometer (M-2000, J. A. Woollam Co., Ltd.) in a visible light region for the value of at 550 nanometer established by the Gen-Osc model.

According to another embodiment, provided is a display device including an article according to an embodiment.

Hereinafter, further embodiments will be described in detail.

DETAILED DESCRIPTION

This disclosure will be described more fully hereinafter with reference to the accompanying drawings, in which embodiments are shown. This disclosure may, however, be embodied in many different forms and is not to be construed as limited to the exemplary embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting. It will be understood that when an element is referred to as being "on" another element, it may be directly on the other element or intervening elements may be present therebetween. In contrast, when an element is referred to as being "directly on" another element, there are no intervening elements present.

As used herein, the singular forms "a", "an" and "the" are intended to include the plural forms as well, unless the context clearly indicates otherwise. The term "or" means "and/or". As used herein, the term "and/or" includes any and all combinations of one or more of the associated listed items. Expressions such as "at least one of", when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) as used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). "Mixture" as used herein is inclusive of all types of combinations, including blends, alloys, solutions, or the like.

As used herein, when a specific definition is not otherwise provided, the term "substituted" refers to a group or compound substituted with at least one substituent including a halogen (—F, —Br, —C, or —I), a hydroxy group, a nitro group, a cyano group, an amino group (—$NH_2$, —$NH(R^{100})$ or —$N(R^{101})(R^{102})$, wherein $R^{100}$, $R^{101}$, and $R^{102}$ are the same or different, and are each independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon group having the specified number of carbon atoms and having a valence of one. Non-limiting examples of the alkyl group are methyl, ethyl, and propyl.

As used herein, the term "alkoxy group" refers to "alkyl-O—", wherein the term "alkyl" has the same meaning as described above. Non-limiting examples of the alkoxy group are methoxy, ethoxy, and propoxy.

As used herein, when a definition is not otherwise provided, the term "alkanoyl" represents "alkyl-C(=O)—", wherein the term "alkyl" has the same meaning as described above.

As used herein, when a definition is not otherwise provided, the term "ester group" represents "—COO-alkyl", wherein the term "alkyl" has the same meaning as described above.

As used herein, the term "arene" or "aryl group", which is used alone or in combination, refers to an aromatic hydrocarbon group containing at least one ring. Non-limiting examples of the arene are benzene and naphthalene, and of the aryl group are phenyl, naphthyl, and tetrahydronaphthyl.

As used herein, the term "alkylene" indicates a straight or branched saturated aliphatic hydrocarbon group having a valence of at least two, optionally substituted with one or more substituents where indicated, provided that the valence of the alkylene group is not exceeded.

As used herein, the term "cycloalkylene" indicates a cyclic saturated aliphatic hydrocarbon group having a valence of at least two, optionally substituted with one or more substituents where indicated, provided that the valence of the cycloalkylene group is not exceeded.

As used herein, when a definition is not otherwise provided, the term "arylene" indicates a group having a valence of 2 or higher formed by the removal of at least two hydrogen atoms from one or more rings of an arene, wherein the hydrogen atoms may be removed from the same or different rings of the arene.

As used herein, when a specific definition is not otherwise provided, the term "alkyl group" refers to a C1 to C30 alkyl group, for example, a C1 to C15 alkyl group, the term "cycloalkyl group" refers to a C3 to C30 cycloalkyl group, for example, a C3 to C18 cycloalkyl group, the term "alkoxy group" refer to a C1 to C30 alkoxy group, for example, a C1 to C18 alkoxy group, the term "ester group" refers to a C2 to C30 ester group, for example, a C2 to C18 ester group, the term "ketone group" refers to a C3 to C30 ketone group, for example, a C3 to C18 ketone group, the term "aryl group" refers to a C6 to C30 aryl group, for example, a C6 to C18 aryl group, the term "alkenyl group" refers to a C2 to C30 alkenyl group, for example, a C2 to C18 alkenyl group, the term "alkynyl group" refers to a C2 to C30 alkynyl group, for example, a C2 to C18 alkynyl group, the term "alkylene group" refers to a C1 to C30 alkylene group, for example, a C1 to C18 alkylene group, and the term "arylene group" refers to a C6 to C30 arylene group, for example, a C6 to C16 arylene group.

As used herein, when a specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example, a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example, a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group including one aromatic ring, two or more aromatic rings fused together to provide a condensed ring system, or two or more moieties independently of the foregoing (a single aromatic ring or a condensed ring system) linked through a single bond or through a functional group such as a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(CH$_3$)$_2$—, —C(CF$_3$)$_2$—, or —C(=O)NH—, for example, through —S(=O)$_2$—, for example a C6 to C30 aryl group or a C6 to C30 arylene group, for example, a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group, each including 1 to 3 heteroatoms such as O, S, N, P, Si, or a combination thereof in one ring, for example, a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group, each including 1 to 3 heteroatoms such as O, S, N, P, Si, or a combination thereof, in one ring.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, when a definition is not otherwise provided, "combination" refers to a mixing or copolymerization of two or more components.

As used herein, when a definition is not otherwise provided, "polyimide" may refer to not only "polyimide" itself which is an imidization product of a polyamic acid, but also "polyamic acid" or a combination of the "polyimide" itself and "polyamic acid". Further, the terms "polyimide" and "polyamic acid" may be understood as the same material.

In addition, in the specification, when a definition is not otherwise provided, the mark "*" may refer to a point of attachment to another atom.

Research efforts directed to converting mobile devices, such as a mobile phone or a tablet personal computer, or the like, to be light, flexible, and bendable are currently of interest and ongoing. In this regard, a flexible and transparent window film for a display device having high hardness and transparency, that may, for example, replace relatively rigid glass to protect the mobile devices, is desired.

Accordingly, a window or protective film having good optical and mechanical properties is desired. Desired optical properties include high light transmittance, low yellowness index (YI), low YI difference after exposure to UV light, low haze, low refractive index, low reflection index, or the like. Mechanical properties, such as hardness, may be provided by a hard coating layer, but a base film having high toughness may ensure that a final film has high mechanical properties.

A polyimide or poly(amide-imide) copolymer has excellent mechanical, thermal, and optical properties, and thus, is widely used as a plastic substrate for a display device, such as an organic light emitting diode (OLED), liquid crystal display (LCD), or the like. In order to use a polyimide or poly(amide-imide) film as a protective or window film for a flexible display device, however, further improved mechanical and optical properties such as high hardness (or modulus), toughness, high light transmittance, low yellowness index, low refractive index, or the like, are desired. It is difficult, however, to improve both mechanical and optical properties of the film at the same time, as the two properties, especially tensile modulus and yellowness index, of a polyimide or poly(amide-imide) film most often co-exist in a trade-off relationship with respect to each other such that improving one property may result in deterioration of the other property.

In an effort to improve mechanical properties of a poly(amide-imide) copolymer film, researchers prepared a poly(amide-imide) copolymer by increasing the amount of an amide structural unit, or by including a dianhydride having a more rigid structure. However, the tensile modulus of such poly(amide-imide) copolymer is barely improved, while optical properties, such as YI, are deteriorated (degraded). In addition, a refractive index of a film prepared from the poly(amide-imide) copolymer may be increased to boost reflection index, or the toughness of the film may be reduced.

The inventors have sought and endeavored to develop a poly(amide-imide) copolymer having good optical properties such as, for example, high light transmittance and low refractive index, as well as improved tensile modulus, and a composition for preparing the poly(amide-imide). As a result, the inventors have found a novel composition for preparing a poly(amide-imide) copolymer including; a diamine having an amide bond between two aromatic rings, one of the rings including a substituent, a tetracarboxylic dianhydride including an alicyclic tetracarboxylic dianhydride having a rigid structure, and an aromatic dicarbonyl compound, which renders a poly(amide-imide) copolymer having improved mechanical properties such as, for example, a high tensile modulus, as well as excellent optical properties such as, for example, a high light transmittance, a low yellowness index, as well as a low refractive index. For example, the prepared poly(amide-imide) copolymer may have a light transmittance of greater than or equal to 86% in a wavelength range of 350 nanometers (nm) to 750 nm, a yellowness index of less than 3, and a refractive index of less than 1.7. Moreover, the poly(amide-imide) copolymer may have a tensile modulus of greater than or equal to 5.5 Gigapascals (GPa).

Accordingly, an embodiment provides a poly(amide-imide) copolymer that is a reaction product of; a diamine including a compound represented by Chemical Formula 1, a tetracarboxylic acid dianhydride including a compound represented by Chemical Formula 2, and a compound represented by Chemical Formula 3:

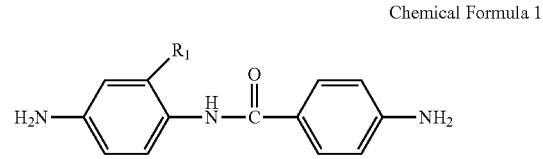

Chemical Formula 1 wherein in Chemical Formula 1,
$R^1$ is a halogen-substituted C1 to C10 alkyl group;

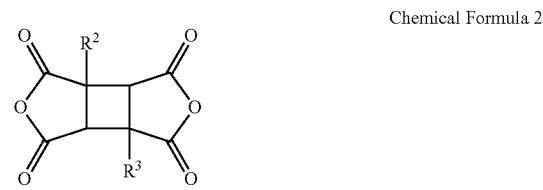

Chemical Formula 2 wherein in Chemical Formula 2,
$R^2$ and $R^3$ are each independently hydrogen, or a halogen-substituted or unsubstituted C1 to C10 alkyl group;

Chemical Formula 3 wherein, in Chemical Formula 3,
$R^4$ is a substituted or unsubstituted phenylene group or a substituted or unsubstituted biphenylene group, and each X is an identical or a different halogen atom.

As shown from the above chemical formula, the compound represented by Chemical Formula 1 includes an amide bond between two aromatic rings, and one of the two aromatic rings has a substituent. It is believed that the compound may attribute to an improvement of light transmittance due to an increased dihedral angle (with respect to the plane of each ring) in a molecule as the compound has a halo-substituted C1 to C10 alkyl group bound to only one of the two aromatic rings. In addition, the asymmetric structure of the compound due to the substituent may also attribute to an improvement in solubility of the compound such that the compound may more readily dissolve in a reaction solution even if present at relatively high concentrations in the solution, and thus, one can provide a poly(amide-imide) copolymer with a greater content of the amide structural unit in the copolymer, which may attribute to an increase of mechanical properties of the copolymer or articles prepared therefrom.

In one embodiment, $R^1$ of the compound represented by Chemical Formula 1 may be a halogen-substituted, for example, a fluoro- or chloro-substituted C1 to C10 alkyl group, for example, and in one exemplary embodiment, $R^1$ may be a trifluoromethyl group.

The compound represented by Chemical Formula 2 is an alicyclic tetracarboxylic dianhydride having a rigid structure, and the compound may contribute to improving mechanical properties of the poly(amide-imide) copolymer or articles produced therefrom due to its rigid structure. In addition, the compound represented by Chemical Formula 2 does not include an aromatic group, and is thought to be helpful for improving optical properties of the poly (amide-imide) copolymer prepared therefrom.

In one exemplary embodiment, $R^2$ and $R^3$ of Chemical Formula 2 may each independently be hydrogen, or a halogen-substituted, for example, a fluoro-substituted or unsubstituted C1 to C4 alkyl group, for example, $R^2$ and $R^3$ may each independently be hydrogen, or an unsubstituted C1 to C4 alkyl group, for example, may be a methyl group or an iso-propyl group.

The compound represented by Chemical Formula 3 is an aromatic dicarboxylic acid derivative, which may react with a diamine to form an amide structural unit. Therefore, the poly(amide-imide) copolymer prepared by including the compound represented by Chemical Formula 3 may exhibit improvement of mechanical properties.

In Chemical Formula 3, $R^4$ may be an unsubstituted phenylene group or an unsubstituted biphenylene group, and X may be all Cl atoms. In one exemplary embodiment, $R^4$ may be an unsubstituted phenylene group, and X may be Cl atoms.

The diamine, a reactant for preparing the poly(amide-imide) copolymer according to an embodiment, may further include a compound represented by Chemical Formula 4, in addition to the compound represented by the Chemical Formula 1:

$NH_2$-A-$NH_2$   Chemical Formula 4 wherein in Chemical Formula 4,

A is a ring system including two or more C6 to C30 aromatic rings linked by a single bond, wherein each of the two or more of the aromatic rings is independently unsubstituted or substituted with an electron-withdrawing group;

The compound represented by Chemical Formula 4 may improve mechanical properties of a poly(amide-imide) copolymer or articles prepared therefrom by linking two or more aromatic rings by a single bond. Further, the compound represented by Chemical Formula 4 may also help to improve optical properties of a poly(amide-imide) copolymer prepared therefrom as the two or more aromatic rings of the compound are each substituted with an electron withdrawing group.

The A may be two C6 to C14 aromatic rings, for example, two phenylene groups connected by a single bond, and the two C6 to C14 aromatic rings, for example, two phenylene groups, may each independently be substituted with a halogen atom, a nitro group, a cyano group, a C1 or C2 haloalkyl group, a C2 to C6 alkanoyl group, or a C2 to C6 acyloxy group. Examples of the compound represented by Chemical Formula 4 may be represented by one or more of the following chemical formulae:

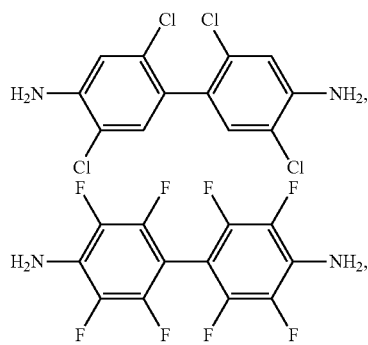

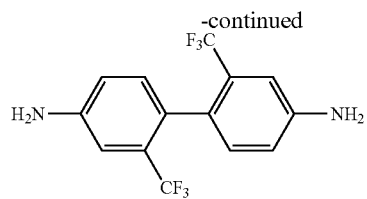

In an exemplary embodiment, the compound represented by Chemical Formula 4 may be 2,2'-bis (trifluoromethyl) benzidine (TFDB) represented by Chemical Formula A below:

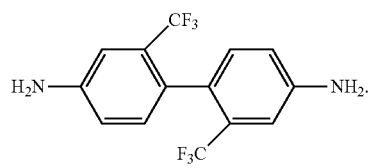 [SMILES: Nc1ccc(-c2ccc(N)cc2C(F)(F)F)c(C(F)(F)F)c1]

The tetracarboxylic acid dianhydride, a reactant for preparing the poly (amide-imide) copolymer according to the embodiment, may further include a compound represented by Chemical Formula 5, in addition to the compound represented by Chemical Formula 2:

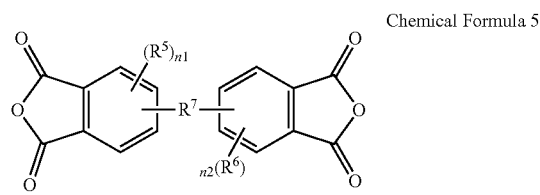

Chemical Formula 5 wherein in Chemical Formula 5, $R^5$ and $R^6$ are each independently a halogen, a hydroxy group, a substituted or unsubstituted C1 to C10 aliphatic organic group, a substituted or unsubstituted C6 to C20 aromatic organic group, a group of formula —$OR^{201}$, wherein $R^{201}$ is a C1 to C10 aliphatic organic group, or a silyl group of formula —$SiR^{210}R^{211}R^{212}$, wherein $R^{210}$, $R^{211}$, and $R^{212}$ are each independently hydrogen or a C1 to C10 aliphatic organic group, $R^7$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, n1 and n2 are each independently an integer ranging from 0 to 3.

The tetracarboxylic dianhydride represented by Chemical Formula 5 includes one substituted, two substituted, or unsubstituted phenylene groups linked by a single bond or various linking groups. Moreover, the substituent and/or the linking group may provide an improvement in mechanical properties and/or optical properties of the resulting poly (amide-imide) copolymer, or an article made therefrom, and such properties may be appropriately adjusted according to the desired purpose and/or application.

In one exemplary embodiment, the compound represented by Chemical Formula 5 may be a compound in which two unsubstituted phenylene groups are linked by one of the linking groups rather than a single bond. For example, in Chemical Formula 5, n1 and n2 may be both 0, $R^7$ may be —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$—C(C$_n$H$_{2n+1}$)$_2$—(CH$_2$)$_q$—, or —(CH$_2$)$_p$—C(C$_n$F$_{2n+1}$)$_2$—(CH$_2$)$_q$— (wherein, $1 \leq n \leq 10$, $1 \leq p \leq 10$, and $1 \leq q \leq 10$), and for example, $R^7$ may be —O—, —S—, —C(=O)—, —CH(OH)—, —C(=O)NH—, —S(=O)$_2$—, or —C(C$_n$F$_{2n+1}$)$_2$— (wherein, $1 \leq n \leq 3$).

In one exemplary embodiment, the compound represented by Chemical Formula 5 may be 4,4'-(hexafluoroisopropylidene) diphthalic anhydride, i.e., 6FDA, when n1 and n2 are both 0, and $R^7$ is —C(CF$^3$)$_2$—, in Chemical Formula 5. When the compound represented by Chemical Formula 5 is 6FDA, the poly(amide-imide) copolymer prepared by including it may have improved optical properties.

The compounds represented by Chemical Formulae 1 to 5 are all compounds that may be easily prepared using methods known in the art, or commercially available. Accordingly, those skilled in the art can easily prepare a poly(amide-imide) copolymer according to an embodiment from the above compounds.

For example, the compound represented by Chemical Formula 3 is firstly reacted with a diamine containing the compound represented by Chemical Formula 1 to form an amide structural unit, and any additional diamine and the compound represented by Chemical Formula 2 are then added to form a composition for the making of the poly(amide-imide) copolymer. By adding and reacting the diamine and the tetracarboxylic dianhydride, an amic acid structural unit resulting from the reaction between the diamine and the tetracarboxylic dianhydride is produced, and at the same time, a poly(amide-imide) copolymer is produced by linking the formed amide structural unit and the amic acid structural unit. The prepared poly(amide-amic acid) copolymer may partially or wholly be imidized by thermal or chemical methods to form a poly(amide-imide) copolymer. A method for preparing a poly(amide-imide) copolymer is well known to those skilled in the art.

An amide structural unit prepared by reacting a diamine represented by Chemical Formula 1 and a dicarbonyl compound represented by Chemical Formula 3 may be represented by Chemical Formula 8, and an imide structural unit prepared by reacting a diamine represented by Chemical Formula 1 and a tetracarboxylic dianhydride may be represented by Chemical Formula 9:

Chemical Formula 8

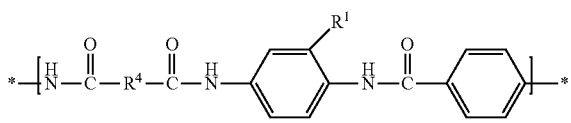

wherein in Chemical Formula 8,
$R^1$ is the same as defined for Chemical Formula 1, and
$R^4$ is the same as defined for Chemical Formula 3;

Chemical Formula 9

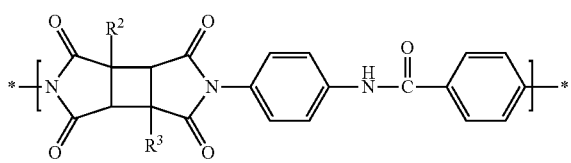

wherein in Chemical Formula 9, $R^1$ is the same as defined for Chemical Formula 1, and $R^2$ and $R^3$ are the same as defined for Chemical Formula 2.

If the diamine further includes a compound represented by Chemical Formula 4 in addition to the compound represented by Chemical Formula 1, the amide structural unit prepared by reacting the compound represented by Chemical Formula 4 with the compound represented by Chemical Formula 3 may be represented by Chemical Formula 10, and the imide structural unit prepared by reacting the compound represented by Chemical Formula 4 with the compound represented by Chemical Formula 2 may be represented by Chemical Formula 11:

Chemical Formula 10

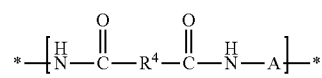

wherein in Chemical Formula 10, $R^4$ is the same as defined for Chemical Formula 3, and A is the same as defined for Chemical Formula 4;

Chemical Formula 11

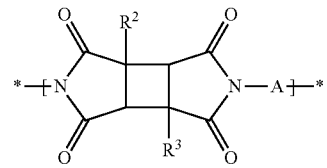

wherein in Chemical Formula 10, $R^2$ and $R^3$ are the same as defined for Chemical Formula 2, and A is the same as defined for Chemical Formula 4.

When the tetracarboxylic dianhydride further includes a compound represented by Chemical Formula 5 in addition to the compound represented by Chemical Formula 2, the imide structural unit prepared by reacting a compound represented by Chemical Formula 5 and a compound represented by Chemical Formula 1 may be represented by Chemical Formula 12, and an imide structural unit prepared by reacting a compound represented by Chemical Formula 5 and a compound represented by Chemical Formula 4 may be represented by Chemical Formula 13:

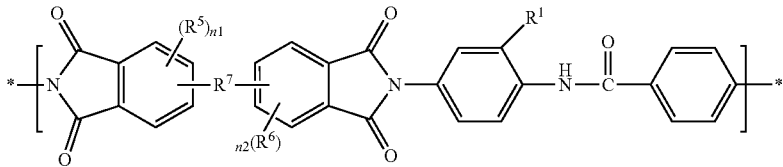

Chemical Formula 12 wherein in Chemical Formula 12,
$R^1$ is the same as defined for Chemical Formula 1, and
$R^5$, $R^6$, $R^7$, n1 and n2 are the same as defined for Chemical Formula 5;

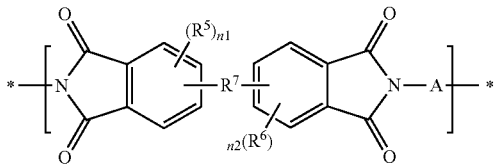

Chemical Formula 13 wherein in Chemical Formula 13,
A is the same as defined for Chemical Formula 4, and
$R^5$, $R^6$, $R^7$, n1 and n2 are the same as defined for Chemical Formula 5.

A poly(amide-imide) copolymer according to an embodiment may include an amide structural unit represented by Chemical Formula 8, and an imide structural unit represented by at least one of Chemical Formula 9, as well as an amide structural unit represented by Chemical Formula 10, and one or more of an imide structural unit represented by Chemical Formulae 11 to 13.

The compound represented by Chemical Formula 1 may be included in an amount of less than or equal to about 55 mole percent (mole %) based on the total amount of the diamine for preparing a poly(amide-imide) copolymer according to an embodiment. For example, the compound represented by Chemical Formula 1 may be included in an amount of less than or equal to about 50 mole %, for example, less than or equal to about 45 mole %, less than or equal to about 40 mole %, less than or equal to about 35 mole %, less than or equal to about 30 mole %, less than or equal to about 25 mole %, less than or equal to about 20 mole %, less than or equal to about 15 mole %, less than or equal to about 10 mole %, less than or equal to about 8 mole %, less than or equal to about 7 mole %, less than or equal to about 6 mole %, or less than or equal to about 5 mole %, based on the total amount of the diamine for preparing a poly(amide-imide) copolymer according to an embodiment, and is not limited thereto.

In an exemplary embodiment, the compound represented by Chemical Formula 1 may be included in an amount of from about 1 mole % to about 50 mole %, for example, from about 1 mole % to about 45 mole %, for example, from about 1 mole % to about 40 mole %, for example, from about 1 mole % to about 35 mole %, for example, from about 1 mole % to about 30 mole %, for example, from about 1 mole % to about 25 mole %, for example, from about 1 mole % to about 20 mole %, for example, from about 1 mole % to about 15 mole %, for example, from about 1 mole % to about 10 mole %, for example, from about 1 mole % to about 8 mole %, for example, from about 1 mole % to about 7 mole %, for example, from about 1 mole % to about 5 mole %, for example, from about 5 mole % to about 50 mole %, for example, from about 5 mole % to about 45 mole %, for example, from about 5 mole % to about 40 mole %, for example, from about 5 mole % to about 35 mole %, for example, from about 5 mole % to about 30 mole %, for example, from about 5 mole % to about 25 mole %, for example, from about 5 mole % to about 23 mole %, for example, from about 5 mole % to about 20 mole %, for example, from about 5 mole % to about 18 mole %, for example, from about 5 mole % to about 15 mole %, for example, from about 5 mole % to about 10 mole %, for example, from about 7 mole % to about 50 mole %, for example, from about 7 mole % to about 45 mole %, for example, from about 7 mole % to about 40 mole %, for example, from about 7 mole % to about 35 mole %, for example, from about 7 mole % to about 30 mole %, for example, from about 7 mole % to about 25 mole %, for example, from about 7 mole % to about 23 mole %, for example, from about 7 mole % to about 20 mole %, for example, from about 7 mole % to about 18 mole %, for example, from about 7 mole % to about 15 mole %, for example, from about 7 mole % to about 13 mole %, for example, or from about 7 mole % to about 10 mole %, based on the total amount of the diamine for preparing a poly (amide-imide) copolymer according to an embodiment, and is not limited thereto.

By including the compound represented by Chemical Formula 1 within the above range based on the total number of moles of the diamine, mechanical properties such as, for example, the tensile modulus, of the poly (amide-imide) copolymer prepared therefrom may be improved, while good optical properties such as, for example, high transmittance, low YI, or the like, may be maintained, and further lower refractive index may be obtained.

According to an embodiment, the compound represented by Chemical Formula 2 may be included in an amount of about 30 mol % to about 70 mol % based on the total number of moles of the tetracarboxylic dianhydride for preparing a poly (amide-imide) copolymer. For example, the compound represented by Chemical Formula 2 may be included in an amount of from about 35 mol % to about 70 mol %, for example, from about 35 mol % to about 65 mol %, for example, from about 35 mol % to about 60 mol %, for example, about 40 mole % to about 70 mole %, for example, about 40 mole % to about 65 mole %, for example, about 40 mole % to about 60 mol %, for example about 45 mol % to about 60 mol %, for example about 45 mol % to about 55 mol %, or for example, about 50 mol %, based on the total number of moles of the tetracarboxylic dianhydride, but is not limited thereto.

If the compound represented by Chemical Formula 2 is included within the above range based on the total number of moles of tetracarboxylic dianhydride, mechanical properties of the poly (amide-imide) copolymer prepared therefrom, for example, tensile modulus is increased, while simultaneously it is possible to maintain optical properties such as, for example, high transmittance and low YI, as well as a lower refractive index may be obtained The total amount of tetracarboxylic dianhydride for preparing the poly(amide-imide) copolymer according to an embodiment may be about 25 mole % to about 90 mole % based on the total mole number of the tetracarboxylic dianhydride and the compound represented by Formula 3.

For example, the tetracarboxylic dianhydride may be included in an amount of from about 30 mol % to about 85 mol %, for example, from about 32 mol % to about 85 mol %, for example, from about 35 mol % to about 85 mol %, for example, from about 35 mol % to about 80 mol %, for example, from about 40 mol % to about 80 mol %, for example, from about 40 mol % to about 75 mole %, for example, from about 45 mole % to about 75 mole %, for example, from about 45 mole % to about 70 mole %, for example, from about 50 mole % to about 70 mol %, for example, from about 50 mol % to about 65 mol %, for example, from about 55 mol % to about 70 mol %, for example, from about 60 mol % to about 70 mol %, for example, from about 65 mol % to about 70 mol %, or for example, about 70 mol %, based on the total number of moles of the tetracarboxylic dianhydride and the compound represented by Chemical Formula 3

If the amount of the tetracarboxylic dianhydride based on the total number of moles of the tetracarboxylic dianhydride and the compound represented by Chemical Formula 3 exceeds the above range, while improvement of mechanical properties of the poly(amide-imide) copolymer prepared therefrom is not substantial, optical properties such as, for example, YI, light transmittance, or the like, may deteriorate. If the amount of the tetracarboxylic dianhydride based on the total number of moles of the tetracarboxylic dianhydride and the compound represented by Chemical Formula 3 is lower than the above range, the poly (amide-imide) copolymer prepared therefrom may be too brittle to be formed as a film.

The total amount of the compound represented by Chemical Formula 1 and the compound represented by Chemical Formula 3 based on the total number of moles of the total monomers for preparing a poly(amide-imide) copolymer may be from about 50 mol % to about 90 mol %, for example, from about 55 mol % to about 90 mol %, for example, from about 60 mol % to about 90 mol %, for example, from about 65 mol % to about 90 mol %, for example, from about 70 mol % to about 90 mol %, for example, from about 72 mol % to about 90 mol %, for example, from about 75 mol % to about 90 mol %, for example, from about 77 mol % to about 90 mol %, for example, from about 80 mol % to about 90 mol %, for example, from about 83 mol % to about 90 mol %, for example, from about 85 mol % to about 90 mol %, or for example, from about 87 mol % to about 90 mol %, but is not limited thereto.

By including the compound represented by Chemical Formula 1 and the compound represented by Chemical Formula 3 based on the total number of moles of the total monomers for preparing a poly(amide-imide) copolymer in an amount of greater than or equal to about 50 mol %, the prepared poly(amide-imide) copolymer may include amide structural unit in an amount of greater than or equal to about 50 mol % based on the number of moles of the total structural units, and thus, may have excellent mechanical properties.

For example, an article including the poly(amide-imide) copolymer, for example, a film having a thickness of about 50 micrometers (μm) may have a light transmittance of greater than or equal to about 86%, for example, greater than or equal to about 86.5%, for example, greater than or equal to about 87%, for example, greater than or equal to about 87%, for example, greater than or equal to about 87.5%, or for example, greater than or equal to about 88%, at a wavelength range of from 350 nm to 750 nm.

For example, an article including the poly(amide-imide) copolymer, for example, a film having a thickness of about 50 micrometers (μm) may have a YI of less than 3, for example, less than or equal to 2.9, for example, less than or equal to 2.8, for example, less than or equal to 2.7, for example, less than or equal to 2.5, for example, less than or equal to 2.4, for example, less than or equal to 2.3, or for example, less than or equal to 2.2.

For example, an article including the poly(amide-imide) copolymer, for example, a film having a thickness of about 50 micrometers may have a refractive index of less than 1.7, for example, less than or equal to 1.69, for example, less than or equal to 1.68 for example, less than or equal to 1.67, or for example, less than or equal to 1.65.

For example, an article including the poly(amide-imide) copolymer, for example, a film having a thickness of about 50 micrometers may have a tensile modulus of greater than or equal to 5.5 GPa, for example, greater than or equal to 5.8 GPa, for example, greater than or equal to 6.0 GPa, for example, greater than or equal to 6.2 GPa, for example, greater than or equal to 6.3 GPa, for example, greater than or equal to 6.4 GPa, for example, greater than or equal to 6.5 GPa, or for example, greater than or equal to 6.6 GPa.

For example, an article including the poly(amide-imide) copolymer, for example, a film having a thickness of about 50 micrometers may have a tensile modulus of greater than or equal to 5.5 GPa, for example, greater than or equal to 5.8 GPa, or for example, greater than or equal to 6.0 GPa, as well as, a refractive index of about less than 1.7, for example, less than or equal to 1.69, for example, less than or equal to 1.68 for example, less than or equal to 1.67, or for example, less than or equal to 1.65. That is, the article including the poly(amide-imide) copolymer according to an embodiment may have excellent mechanical properties, as well as excellent optical properties.

As shown from the later-described Examples and Comparative Examples, the poly(imide-amide) copolymer according to Comparative Example 1, which is prepared by an aromatic diamine, an aromatic tetracarboxylic dianhydride, and an aromatic dicarbonyl compound, without the compound represented by Chemical Formula 1 and the compound represented by Chemical Formula 2, has a relatively high tensile modulus of about 6.2 GPa and a refractive index of 1.71, while the tensile modulus may further increase to 6.6 GPa (in Example 1) or to 6.4 GPa (in Example 2) and the refractive index may further decrease to 1.67 (in Example 1) or to 1.65 if the poly(imide-amide) copolymer is prepared by further including the compound represented by Chemical Formula 1 and the compound represented by Chemical Formula 2 in addition to the aromatic diamine, aromatic tetracarboxylic dianhydride, and aromatic dicarbonyl compound. That is, the poly (imide-amide) copolymer according to an embodiment may achieve excellent mechanical properties, as well as low refractive index, and thus, the mechanical properties and optical properties that are generally observed to coexist as a trade-off relationship may simultaneously be improved in the poly (imide-amide) copolymer according to an embodiment.

As described above, the poly(amide-imide) copolymer according to an embodiment is prepared by including the diamine including a compound represented by Chemical Formula 1, and the tetracarboxylic dianhydride including a compound represented by Chemical Formula 2, and thus, it has a surprising effect of lowering refractive index, while maintaining excellent mechanical properties and optical properties such as, for example, high light transmittance, low YI, or the like, compared with a poly(amide-imide) copolymer prepared not including the compound represented by Chemical Formula 1 and the compound represented by Chemical Formula 2. Accordingly, the poly (amide-imide) copolymer according to an embodiment may be advantageous for a use in a display device such as, for example, as a protective or window film for a flexible display device, which will necessarily demand enhanced mechanical and optical properties.

Another embodiment provides a composition for preparing a poly(amide-imide) copolymer including a compound represented by Chemical Formula 1, a compound represented by Chemical Formula 2, and a compound represented by Chemical Formula 6:

Chemical Formula 1

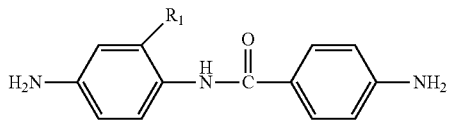

wherein in Chemical Formula 1,
$R^1$ is a halogen-substituted C1 to C10 alkyl group;

Chemical Formula 2

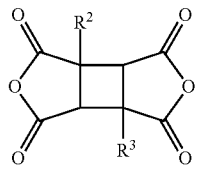

wherein in Chemical Formula 2,
$R^2$ and $R^3$ are independently hydrogen, or a halogen-substituted or unsubstituted C1 to C10 alkyl group;

Chemical Formula 6

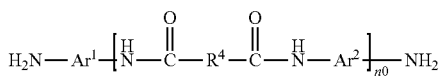

wherein, in Chemical Formula 6,
n0 is an integer of greater than or equal to 1,
$R^4$ is a substituted or unsubstituted phenylene group or a substituted or unsubstituted biphenylene group, and
$Ar^1$ and $Ar^2$ are, each independently, represented by Chemical Formula 7:

Chemical Formula 7

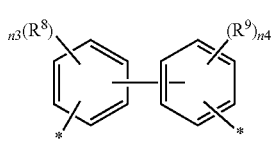

wherein, in Chemical Formula 7, $R^8$ and $R^9$ are each independently —$CF_3$, —$CCl_3$, —$CBr_3$, —$Cl_3$, —$NO_2$, —CN, —C(=O)$CH_3$, or —$CO_2C_2H_5$, and
n3 and n4 are each independently an integer ranging from 1 to 4.

As described above, in a conventional method for preparing a poly(amide-imide) copolymer, an amide structural unit may first be prepared by a reaction of a dicarbonyl compound and a diamine, and then an additional diamine and a dianhydride compound are added to the reactor to prepare an amic acid structural unit. Moreover, as soon as the amic acid structural unit is prepared, the prepared amide structural unit and the amic acid structural unit are linked to prepare a poly(amide-imide) copolymer. Meanwhile, in the process of preparing the amide structural unit, a by-product, such as halogenated hydrogen (HX: 'H' indicates hydrogen, and 'X' indicates halogen), for example, hydrogen chloride (HCl), is problematically produced. The hydrogen chloride by-product causes corrosion of an element of an apparatus, and thus, should be removed by a precipitation process. In order to remove the by-product, an HX scavenger, such as a tertiary amine, may be added to the reactor, whereby a salt of HX is produced (please see Reaction Scheme 1 below). If the produced salt of HX is not removed and a film is produced therefrom, serious deterioration of optical properties of the produced film occurs. Therefore, a precipitation process to remove the salt of HX is required in the conventional method for preparing poly(amide-imide) copolymer. The precipitation process increases total process time and cost, while reducing the yield of the final poly(amide-imide) copolymer produced therefrom.

Reaction Scheme 1

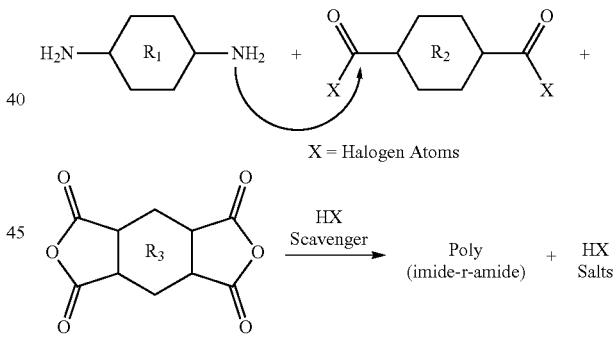

In addition to using the conventional method including the precipitation process as described above, it is also possible to prepare a poly(amide-imide) copolymer according to an embodiment by first reacting a diamine and a dicarbonyl compound to prepare an amide structural unit-containing oligomer having amino groups at both ends thereof (hereinafter, referred to as "an amide structural unit-containing oligomer"), and then reacting the prepared amide structural unit-containing oligomer as a diamine monomer with a tetracarboxylic acid dianhydride to provide a poly(amide-imide) copolymer. According to the new method for preparing a poly(amide-imide) copolymer, the precipitation process for removing the HX salt may be omitted, and thus, not only the total process time and cost may be reduced, but also the yield of the final poly(amide-imide) copolymer may increase. Moreover, it is also possible to obtain a poly(amide-imide) copolymer including a higher amount of an amide structural unit than those prepared by using the conventional method, and thus, an article prepared from the poly(amide-imide) copolymer, for example, a film, may exhibit improved mechanical properties, while maintaining good optical properties.

Accordingly, another embodiment provides a composition for preparing a poly(amide-imide) copolymer including an amide structural unit-containing oligomer represented by Chemical Formula 6 as a diamine monomer, which may be prepared by reacting a diamine and a dicarbonyl compound, a tetracarboxylic acid dianhydride represented by Chemical Formula 2 for reacting with the oligomer to provide an imide structural unit, and as an additional diamine, a diamine represented by Chemical Formula 1, for reacting with the tetracarboxylic acid dianhydride represented by Chemical Formula 2 to provide an additional imide structural unit.

In the composition according to an embodiment, explanations for the compound represented by Chemical Formula 1 and the compound represented by Chemical Formula 2 are the same as those for the compounds included in the reactants for preparing a poly (amide-imide) copolymer, and thus, a detailed description is omitted.

The compound represented by Chemical Formula 6 may be prepared by reacting a compound represented by Chemical Formula 3, which was explained in the above, and a compound represented by Chemical Formula 4 below:

Chemical Formula 3

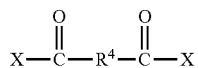

wherein in Chemical Formula 3,
$R^4$ is a substituted or unsubstituted phenylene group or a substituted or unsubstituted biphenylene group, and
each X is identical or different halogen atom, NH$_2$-A-NH$_2$   Chemical Formula 4 wherein in Chemical Formula 4,
A is a ring system including two or more C6 to C30 aromatic rings linked by a single bond, wherein each of the two or more of the aromatic rings is independently unsubstituted or substituted with an electron-withdrawing group.

As the compound represented by Chemical Formula 3 and the compound represented by Chemical Formula 4 are the same as those included in the reactants for preparing a poly (amide-imide) copolymer, and thus, detailed descriptions for these compounds are also omitted.

The compound represented by Chemical Formula 6 may be prepared by reacting the diamine represented by Chemical Formula 4 in excess with the compound represented by Chemical Formula 3 to become an oligomer having two ends thereof capped with two amino groups. In this case, as the diamine represented by Chemical Formula 4 is used in excess, it may remain unreacted with the compound represented by Chemical Formula 3 in the reactor. The unreacted compound, i.e., the compound represented by Chemical Formula 4, may react with the compound represented by Chemical Formula 2 to form an imide structural unit, as the diamine represented by Chemical Formula 6 in a form of an oligomer does. Accordingly, in an exemplary embodiment, the composition may further include a diamine represented by Chemical Formula 4.

Further, the composition may include the compound represented by Chemical Formula 5:

Chemical Formula 5

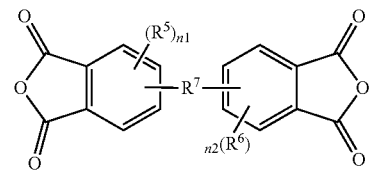

wherein, in Chemical Formula 5, $R^5$ and $R^6$ are each independently a halogen, a hydroxy group, a substituted or unsubstituted C1 to C10 aliphatic organic group, a substituted or unsubstituted C6 to C20 aromatic organic group, a group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are each independently hydrogen or a C1 to C10 aliphatic organic group, $R^7$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, and n1 and n2 are each independently an integer ranging from 0 to 3.

The compound represented by Chemical Formula 5 is a tetracarboxylic dianhydride that may be included in the reactants for preparing a poly (amide-imide) copolymer according to an embodiment, and thus, the same explanations for the compound are omitted herein.

In an exemplary embodiment, the compound represented by Chemical Formula 4 may be represented by one or more of the following chemical formulae:

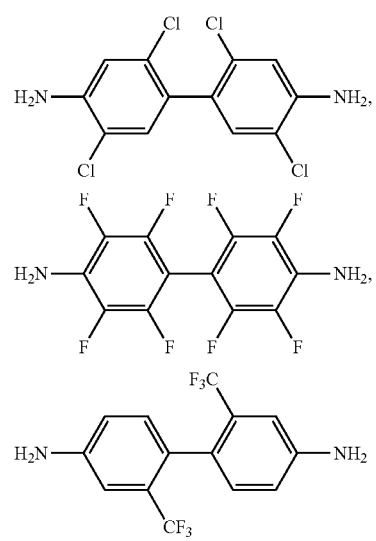

In an exemplary embodiment, the compound represented by Chemical Formula 4 may be 2,2'-bis (trifluoromethyl) benzidine (TFDB) represented by Chemical Formula A below:

Chemical Formula A

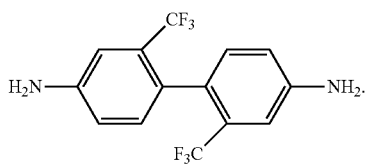

In an exemplary embodiment, the compound represented by Chemical Formula 5 may be represented by Chemical Formula 5-1:

Chemical Formula 5-1

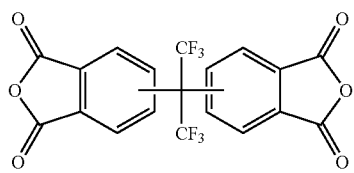

In an exemplary embodiment, R4 of Chemical Formula 6 may be a substituted or unsubstituted phenylene group, and $Ar^1$ and $Ar^2$ may both be represented by Chemical Formula 7:

Chemical Formula 7

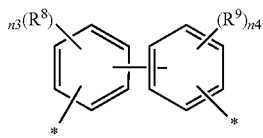

wherein in Chemical Formula 7, $R^8$ and $R^9$ may both be —$CF_3$, and n3 and n4 may both be 1.

After preparing a poly(amide-imide) copolymer from the composition, an article may be formed from the poly(amide-imide) copolymer through a dry-wet method, a dry method, or a wet method, but is not limited thereto. When the article is a film, it may be manufactured using a solution including the composition through the dry-wet method wherein a layer is formed by extruding the solution of the composition from, e.g., a die, onto a support, such as drum or an endless belt, drying the layer by evaporating the solvent from the layer until the layer has a consistent property, such as a consistent weight. The drying may be performed by heating, for example, from about 25° C. to about 150° C., within about 1 hour or less. Then, the dried layer may be heated from the room temperature to about 200° C. or to about 300° C. at a heating rate of about 10° C. per minute, and then be allowed to stand at the heated temperature for about 5 minutes to about 30 minutes to obtain a poly(amide-imide)-based film.

When the surface of the drum and/or the endless belt used for the drying process is flat, a layer with a flat surface is formed. The layer obtained after the drying process is delaminated from the support, and subjected to a wet process, desalted, and/or further removal of solvent. The manufacturing of the film is completed after the layer is elongated, dried, and/or heat treated. The heat treatment may be performed at about 200° C. to about 500° C., for example, at about 250° C. to about 400° C., for several seconds to several minutes.

After the heat treatment, the layer may be cooled slowly, for example, at a cooling rate of less than or equal to about 50° C. per minute.

The layer may be formed as a single layer or multiple layers.

When prepared as a film, the film may have a yellowness index (YI) of less than 3 at a thickness of about 35 micrometers (μm) to about 100 μm, for example, about 50 μm, as measured according to an ASTM D1925 method, a light transmittance of greater than or equal to 86% in a wavelength range of 350 nanometers (nm) to 750 nm and a refractive index of less than 1.7, which shows excellent optical properties. Further, the film has a tensile modulus of greater than or equal to 5.0 GPa, which exhibits good mechanical properties.

Thus, the article may maintain good mechanical properties of a poly(amide-imide) copolymer, such as, for example, a high tensile modulus, and it may have excellent optical properties such as, for example, a greater light transmittance, a lower YI, and a lower refractive index, and thus, may be advantageous for a use as a protective or window film for a flexible display device.

Hereafter, the technology of this disclosure is described in detail with reference to examples. The following examples and comparative examples are not restrictive but are illustrative only.

EXAMPLES

Synthesis Example 1: Synthesis of 4-amino-N-[4-amino-2-(trifluoromethyl) phenyl] benzamide (AAFPB)

30 gram (g) of 4-nitro-2(trifluoromethyl)aniline and 27 g of 4-nitrobenzoyl chloride, as reactants, are introduced into a reactor, which was charged with 300 milli liters (ml) of N,N-dimethyl acetamide (DMAc), 13.82 g of pyridine, i.e., 1.2 molar equivalent with respect to the reactants, is added to the reactor, and reaction mixture is stirred for 12 hours at a room temperature. The product is reprecipitated with ethanol to obtain 4-nitro-N-[4-nitro-2-(trifluoromethyl)phenyl] benzamide, and is dried in a vacuum, 30 g of the reprecipitated product is added to a reactor, 300 ml of ethanol is added, 3 g of 10% Pd (palladium) on carbon and 2.2 molar equivalent (9.3 g) of hydrazine monohydrate are added to the reactor, and the reaction mixture is stirred for 24 hours at room temperature. As a result, the final product 4-amino-N-[4-amino-2-(trifluoromethyl)phenyl] benzamide (AAFPB) is obtained.

Synthesis Example 2: Synthesis of a stereoisomer, trans-dimethylcyclobutyl dianhydride (DMCBDA)

30 g of 2-methyl maleic anhydride and 400 ml of diethylcarbonate is added to a reactor, and a uV light generator in a form of a rod is immersed into the reaction solution and the exterior of the reactor is wrapped with aluminum foil. With stirring, the reaction solution is irradiated with ultraviolet (uV) light for 48 hours.

After completion of reaction, the precipitated solid is isolated, washed with methanol for 3 times, and dried. The washed and dried precipitate is added to a reactor with 150 ml of acetic anhydride, and the reaction mixture is refluxed for 48 hours. After the reaction, the resulting solid is isolated by cooling, washed with methanol for 3 times, and dried to obtain the final stereoisomer of trans-dimethylcyclobutyl dianhydride (DMCBDA).

Synthesis Example 3: Preparation of an Oligomer Containing 70 Mole Percent (Mole %) of an Amide Structural Unit as a Diamine Monomer An amide structural unit-containing oligomer, as a diamine monomer, is prepared by reacting TPCl and 2,2'-bis(trifluoromethyl)benzidine (TFDB), in accordance with Reaction Scheme 2:

Reaction Scheme 2

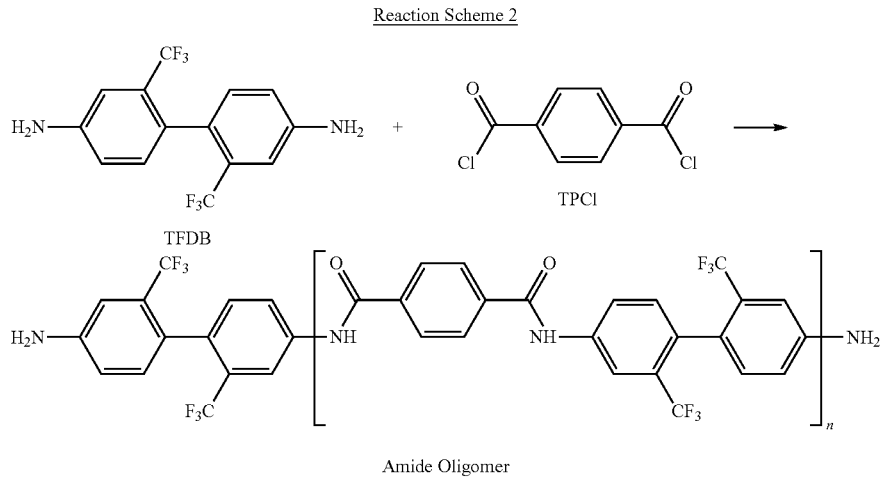

Amide Oligomer

That is, 1 mole equivalent (0.122 mole, 39.2 grams) of 2,2'-bis(trifluoromethyl)benzidine (TFDB) and 2.8 mole equivalent (0.343 mole, 27.11 grams) of pyridine are dissolved in 700 grams (g) of N,N-dimethyl acetamide (DMAc) as a solvent in a round-bottomed flask, and 50 milliliters (mL) of DMAC is further added to the flask to dissolve the remaining TFDB. Then, 0.7 mole equivalent (0.086 mole, 17.4 g) of terephthaloyl chloride (TPCl) is divided into 4 portions, which are then individually added to the flask as separate portions over time to react with the TFDB. The mixture is then vigorously stirred and reacted for 15 minutes at room temperature.

The solution is further stirred under a nitrogen atmosphere for 2 hours, and then added to 7 liters of water containing 350 g of NaCl. The resulting mixture is stirred for 10 minutes. A resulting solid is filtered, re-suspended twice by using 5 liters (L) of deionized water, and then re-filtered. The water remaining in the final product on the filter is removed to the extent possible by thoroughly pressing the filtered precipitate on a filter. The precipitate is then dried at 90° C. under vacuum for 48 hours, to obtain an amide structural unit-containing oligomer represented in Reaction Scheme 2, as a diamine monomer, as a final product. The prepared oligomer containing 70 mole % of amide structural unit has a number average molecular weight of about 1,400 grams per mole (g/mole).

Examples and Comparative Example: Preparation of poly (amide-imide) copolymer films.

Example 1

98.4 grams (g) of N,N-dimethylacetamide (DMAc) as a solvent is charged into a double-walled 250 mL reactor, pre-heated to 25° C., and equipped with a mechanical stirrer and a nitrogen inlet. Then, 13.54 g of the 70 mole % of amide structural unit-containing oligomer prepared in Synthesis Example 3, and 0.835 g of 4-amino-N-[4-amino-2-(trifluoromethyl)phenyl] benzamide (AAFPB) prepared in Synthesis Example 1 are added to the reactor, while maintaining the temperature at 25° C. Then, 0.83 g (0.0018 mol) of cyclobutyl dianhydride (CBDA), and 6.26 g (0.0018 mol) of 4,4'-(hexafluoroisopropylidene)diphthalic anhydride (6FDA) are added to the reactor and stirred for 48 hours. Then, 1.12 g of pyridine and 4.33 g of acetic anhydride are added to the reactor, and the mixture is stirred for 24 hours to obtain a poly(amic acid-amide) copolymer solution, of which the solid content is 17.2 weight percent (wt %).

After completion of the reaction, the obtained poly(amic acid-amide) solution is casted on a glass substrate, and dried for 40 minutes on a hot plate at a temperature of 100° C. The resulting film is separated from the glass substrate and introduced into a furnace, wherein the temperature is increased from room temperature to 250° C., at a heating rate of 10° C. per minutes, maintained at 250° C. for about 20 minutes, and then the temperature is slowly reduced to room temperature to obtain a poly(amide-imide) copolymer film.

Example 2

97.2 g of N,N-dimethylacetamide (DMAc) as a solvent is charged into a double-walled 250 mL reactor, pre-heated to 25° C., and equipped with a mechanical stirrer and a nitrogen inlet. Then, 10.86 g of the 70 mole % of amide structural unit-containing oligomer prepared in Synthesis Example 3, and 2.83 g of 4-amino-N-[4-amino-2-(trifluoromethyl)phenyl] benzamide (AAFPB) prepared in Synthesis Example 1 are added to the reactor, while maintaining the temperature at 25° C. Then, 2.15 g of cyclobutyl dianhydride (CBDA), and 4.26 g of 4,4'-(hexafluoroisopropylidene) diphthalic anhydride (6FDA) are added to the reactor and the reaction mixture is stirred for 48 hours. Then, 1.51 g of pyridine and 5.87 g of acetic anhydride are added to the reactor, and the mixture is stirred for 24 hours to obtain a poly(amic acid-amide) copolymer solution, of which the solid content is 17.9 weight percent (wt %).

After completion of the reaction, the obtained poly(amic acid-amide) solution is casted on a glass substrate, and dried for 40 minutes on a hot plate at a temperature of 100° C. The resulting film is separated from the glass substrate and introduced into a furnace, wherein the temperature is increased from room temperature to 250° C., at a heating rate of 10° C. per minutes, maintained at 250° C. for about 20 minutes, and then the temperature is slowly reduced to room temperature to obtain a poly(amide-imide) copolymer film.

Example 3

64.8 g of N,N-dimethylacetamide (DMAc) as a solvent is charged into a double-walled 250 mL reactor, pre-heated to 25° C., and equipped with a mechanical stirrer and a nitrogen inlet. Then, 4.04 g of the 70 mole % of amide structural unit-containing oligomer prepared in Synthesis Example 3, and 4.21 g of 4-amino-N-[4-amino-2-(trifluoromethyl)phenyl] benzamide (AAFPB) prepared in Synthesis Example 1 are added to the reactor, while maintaining the temperature to 25° C. Then, 2.00 g of cyclobutyl dianhydride (CBDA), and 3.96 g of 4,4'-(hexafluoroisopropylidene)diphthalic anhydride (6FDA) are added to the reactor and the reaction mixture is stirred for 48 hours. Then, 1.41 g of pyridine and 5.45 g of acetic anhydride are added to the reactor, and the mixture is stirred for 24 hours to obtain a poly(amic acid-amide) copolymer solution, of which the solid content is 17.5 weight percent (wt %).

After completion of the reaction, the obtained poly(amic acid-amide) solution is casted on a glass substrate, and dried for 40 minutes on a hot plate at a temperature of 100° C. The resulting film is separated from the glass substrate and introduced into a furnace, wherein the temperature is increased from room temperature to 250° C., at a heating rate of 10° C. per minutes, maintained at 250° C. for about 20 minutes, and then the temperature is slowly reduced to room temperature to obtain a poly(amide-imide) copolymer film.

Comparative Example 1

121.5 g of N,N-dimethylacetamide (DMAc) as a solvent is charged into a double-walled 250 mL reactor, pre-heated to 25° C., and equipped with a mechanical stirrer and a nitrogen inlet. Then, 14.25 g of 2,2'-bis(trifluoromethyl) benzidine (TFDB), is added thereto and dissolved, and the temperature is set to 25° C. Then, 4.36 g of cyclobutyl dianhydride (CBDA), and 9.89 g of 4,4'-(hexafluoroisopropylidene)diphthalic anhydride (6FDA) are added to the reactor, and the mixture is stirred for 48 hours. Then, 3.52 g of pyridine and 13.63 g of acetic anhydride are added to the reactor, and the mixture is stirred for 24 hours to obtain a poly(amic acid-amide) copolymer solution, of which the solid content is 17.1 wt %.

After completion of the reaction, the obtained poly(amic acid-amide) solution is casted on a glass substrate, and dried for 40 minutes on a hot plate at a temperature of 100° C. The resulting film is separated from the glass substrate and introduced into a furnace, wherein the temperature is increased from room temperature to 250° C., at a heating rate of 10° C. per minutes, maintained at 250° C. for about 20 minutes, and then the temperature is slowly reduced to room temperature to obtain a poly(amide-imide) copolymer film.

Comparative Example 2

129 g of N,N-dimethylacetamide (DMAc) as a solvent is charged into a double-walled 250 mL reactor, pre-heated to 25° C., and equipped with a mechanical stirrer and a nitrogen inlet. Then, 16.59 g of the 70 mole % of amide structural unit-containing oligomer prepared in Synthesis Example 3 is added to the reactor, while maintaining the temperature to 25° C. Then, 1.55 g of 3,3',4,4'-biphenyltetracarboxylic dianhydride (BPDA), and 2.86 g of 4,4'-(hexafluoroisopropylidene)diphthalic anhydride (6FDA) are added to the reactor and the reaction mixture stirred for 48 hours. Then, 0.93 g of pyridine and 3.58 g of acetic anhydride are to the reactor, and the mixture is stirred for 24 hours to obtain a poly(amic acid-amide) copolymer solution, of which the solid content is 13.6 weight percent (wt %).

After completion of the reaction, the obtained poly(amic acid-amide) solution is casted on a glass substrate, and dried for 40 minutes on a hot plate at a temperature of 100° C. The resulting film is separated from the glass substrate and introduced into a furnace, wherein the temperature is increased from room temperature to 250° C., at a heating rate of 10° C. per minutes, maintained at 250° C. for about 20 minutes, and then the temperature is slowly reduced to room temperature to obtain a poly(amide-imide) copolymer film.

Comparative Example 3

130.5 g of N,N-dimethylacetamide (DMAc) as a solvent is charged into a double-walled 250 mL reactor, pre-heated to 25° C., and equipped with a mechanical stirrer and a nitrogen inlet. Then, 16.84 g of the 70 mole % of amide structural unit-containing oligomer prepared in Synthesis Example 3 is added to the reactor, and the temperature is set to 25° C. Then, 2.66 g of trans-dimethylcyclobutyl dianhydride (DMCBDA) prepared in Synthesis Example 2 is added to the reactor and the reaction mixture is stirred for 48 hours. Then, 0.94 g of pyridine and 3.64 g of acetic anhydride are added to the reactor, and the mixture is stirred for 24 hours to obtain a poly(amic acid-amide) copolymer solution, of which the solid content is 12.6 wt %.

After cooling the poly(amic acid-amide) solution to a temperature of 25° C., the solution is casted on a glass substrate, and dried for 40 minutes on a hot plate at a temperature of 100° C. The resulting film is separated from the glass substrate and introduced into a furnace, wherein the temperature is increased from room temperature to 230° C., at a heating rate of 10° C. per minutes, maintained at 230° C. for about 20 minutes, and then the temperature is slowly reduced to room temperature to obtain a poly(amide-imide) copolymer film.

Comparative Example 4

96 g of N,N-dimethylacetamide (DMAc) as a solvent is charged into a double-walled 250 mL reactor, pre-heated to 25° C., and equipped with a mechanical stirrer and a nitrogen inlet. Then, 12.43 g of 2,2'-bis(trifluoromethyl) benzidine (TFDB) is added to the reactor, and the temperature is set to 25° C. Then, 3.81 g of cyclobutyl dianhydride (CBDA), 0.87 g of trans-dimethylcyclobutyl dianhydride (DMCBDA) prepared in Synthesis Example 2, and 6.90 g of 4,4'-(hexafluoroisopropylidene) diphthalic anhydride (6FDA) are added to the reactor, and the mixture is stirred for 48 hours. Then, 1.84 g of pyridine and 7.13 g of acetic anhydride are added to the reactor, and the mixture is stirred for 24 hours to obtain a poly(amic acid-amide) copolymer solution, of which the solid content is 18.6 wt %.

After cooling the poly(amic acid-amide) solution to a temperature of 25° C., the solution is casted on a glass substrate, and dried for 40 minutes on a hot plate at a temperature of 100° C. The resulting film is separated from the glass substrate and introduced into a furnace, wherein the temperature is increased from room temperature to 230° C., at a heating rate of 10° C. per minutes, maintained at 230° C. for about 20 minutes, and then the temperature is slowly reduced to room temperature to obtain a poly(amide-imide) copolymer film.

Evaluation: Evaluation of Mechanical and Optical Properties of the Films.

Each of the poly(amide-imide) copolymer films or polyimide film prepared in Examples 1 to 3 and Comparative Examples 1 to 4 are evaluated for mechanical properties and optical properties, and the obtained values are described in Table 1 below.

Particularly, a light transmittance, YI, tensile modulus, and refractive index for each film are measured.

Yellowness index (YI), and percent light transmittance (Trans. %, at a wavelength range of 350 nm to 750 nm) are measured for a film having a thickness (THK) of about 50 micrometers (μm), according to an ASTM D1925 method by using a spectrophotometer, CM-3600d made by Konica Minolta.

Refractive index (R.I.) is measured by using an Ellipsometer (M-2000, J. A. Woollam Co., Ltd.) in a visible light region at 550 nanometer established by the Gen-Osc model.

Tensile modulus (TMod.) is measured according to an ASTM D882 method.

group and a substituted phenylene group, AAFPB, prepared in Synthesis Example 1, nor an alicyclic tetracarboxylic dianhydride, CBDA. The film has a tensile modulus of 6.2 GPa, and a relatively high light transmittance and a relatively low YI, which indicates relatively good optical properties. However, the film of comparative example 2 also has a refractive index of 1.71, which is the highest value among all the films according to the Examples and Comparative Examples.

The poly (amide-imide) copolymer film according to Comparative Example 3 is prepared by polymerizing an aromatic diamine, i.e., TFDB, an alicyclic tetracarboxylic dianhydride, i.e., trans-dimethylcyclobutyl dianhydride (DMCBDA), and an aromatic dicarbonyl compound, i.e., TPCI, without including the diamine having an amide group and a substituted phenylene group, AAFPB, prepared in Synthesis Example 1. The poly (amide-imide) copolymer solution according to Comparative Example 3 has a very low viscosity, and thus, the poly(amide-imide) copolymer is too brittle to be formed into a film.

The polyimide film according to Comparative Example 4 is prepared by polymerizing an aromatic diamine, i.e., TFDB, alicyclic tetracarboxylic dianhydrides including CBDA and DMCBDA, and an aromatic tetracarboxylic dianhydride, 6FDA, without including the diamine having

TABLE 1

| | Composition | Trans. [%] | YI @ 50 μm | Modulus [GPa] | Strain (%) tensile | Strain (%) yield | R.I. |
|---|---|---|---|---|---|---|---|
| Comparative Example 1 | CBDA/6FDA/TFDB = 50/50/100 | 90 | 1.9 | 4.2 | 10.1 | 2.01 | 1.57 |
| Comparative Example 2 | 6FDA/BPDA/TPCI/TFDB = 16/14/70/100 | 88.6 | 2.5 | 6.2 | 8.3 | 2.05 | 1.71 |
| Comparative Example 3 | DMCBDA/TPCI/TFDB = 30/70/100 | — | — | — | — | — | — |
| Comparative Example 4 | CBDA/DMCBDA/6FDA/TFDB = 50/10/40/100 | — | — | — | — | — | — |
| Example 1 | CBDA/6FDA/TPCI/TFDB/AAFPB = 17/17/65/93/7 | 88.0 | 2.2 | 6.6 | 12.9 | 2.05 | 1.67 |
| Example 2 | CBDA/6FDA/TPCI/TFDB/AAFPB = 23/23/54/77/23 | 88.0 | 2.9 | 6.4 | 10.7 | 2.02 | 1.65 |
| Example 3 | CBDA/6FDA/TPCI/TFDB/AAFPB = 34/34/32/45/55 | 86.0 | 5.8 | 6.1 | 8.5 | 1.7 | 1.65 |

As shown in Table 1, the polyimide film according to Comparative Example 1 is prepared by polymerizing an aromatic diamine, i.e., TFDB, an aromatic tetracarboxylic dianhydride, i.e., 6FDA, and an alicyclic tetracarboxylic dianhydride, i.e., CBDA, without including the diamine having an amide group and a substituted phenylene group such as, AAFPB, prepared in Synthesis Example 1. The polyimide film has a tensile modulus of 4.2 GPa, the lowest value among the films, except those according to Comparative Example 3 and Comparative Example 4 that cannot be formed into a film as they are too brittle. Meanwhile, the film according to Comparative Example 1 has the highest light transmittance and the lowest YI and refractive index among the films, which indicate excellent optical properties. That is, as the film does not include an amide group or amide structural unit in the polymer structure, it has good optical properties, but not good mechanical properties.

The poly (amide-imide) copolymer film according to Comparative Example 2 is prepared by polymerizing an aromatic diamine, i.e., TFDB, aromatic tetracarboxylic dianhydrides including 6FDA and BPDA, and an aromatic dicarbonyl compound, without the diamine having an amide group and a substituted phenylene group, AAFPB, prepared in Synthesis Example 1. The polyimide solution also has a very low viscosity, and thus, the polyimide is too brittle to be formed into a film.

Meanwhile, the poly(amide-imide) copolymer films according to Examples 1 to 3 are prepared by polymerizing diamines including AAFPB prepared in Synthesis Example 1, which has an amide group, and an aromatic diamine, i.e., TFDB, an alicyclic tetracarboxylic dianhydride, i.e., CBDA, an aromatic tetracarboxylic dianhydride, i.e., 6FDA, and an aromatic dicarbonyl compound, i.e., TPCI. The mole ratios between AAFPB and TFDB vary according to the Examples 1 to 3, and the mole ratio between CBDA and 6FDA is about 1:1 in all the Examples. The films according to Examples 1 to 3 exhibit reduced refractive indices as the amount of AAFPB, the asymmetric diamine including an amide group, is increased. The Example 1 to 3 films also exhibit slightly reduced mechanical properties, though the tensile moduli of each of the films is greater than 6 GPa, which is acceptable. Further, the average light transmittance for each of the films is greater than or equal to 86%, and an a transmittance of about 88% is observed if the amount of AAFPB is reduced to less than 55 mol %. If the amount of AAFPB is less than 55 mol %, YI is shown to be less than 3. In contrast, if the amount of AAFPB increases to 55 mol %, YI also increases to 5.8 as shown in Example 3.

Particularly, the tensile modulus of the film according to Example 1 prepared by including about 7 mol % of AAFPB based on the total mole number of the diamines is 6.6 GPa, which is greater than that of the film according to Comparative Example 2, is the latter prepared by including a greater amount of the aromatic dicarboxylic derivative, TPCI to form the amide structural unit than Example 1. As the tensile modulus increases, the tensile strength increases, and thus, the tensile strain of the film according to Example 1 is 12.9%, which is greater than the film of Comparative Example 2, which exhibits 8.3%. Meanwhile, the refractive index of the film according to Example 1 is 1.67, which is significantly lower than that of the film according to Comparative Example 2, which has a value of 1.71. That is, the film according to Example 1 has a surprising effect that its refractive index is greatly reduced, while simultaneously improving mechanical properties such as, for example, a tensile modulus. Again, Example 1 is prepared by polymerizing an asymmetric diamine, AAFPB, prepared by Synthesis Example 1, an aromatic tetracarboxylic dianhydride, and an alicyclic tetracarboxylic dianhydride. Moreover, this result is possible without having to reduce the amount of the aromatic dicarboxylic compound, TPCI.

The film according to Example 2 is prepared by including a higher content of the asymmetric diamine having an amide group, AAFPB, prepared in Synthesis Example 1, than is used to prepare Example 1, about 23 mol %. In this case, one observes a slight reduction in the tensile modulus compared to Example 1, refractive index further reduces to 1.65, and the average light transmittance is substantially the same as in Example 1.

The film according to Example 3 includes the diamine, AAFPB, in an amount of about 55 mol %, based on the total mole number of the diamines. In this case, one observes a further reduction in the tensile modulus to 5.8 GPa, while the refractive index is about 1.65, which is the same as in Example 2, but lower than that of Example 1 or Comparative Example 2.

In addition, as noted from Examples 1 to 3, as the tensile moduli of the films increase, the tensile strains also increase. That is, the tensile modulus and the tensile strain are in a proportional relationship. Accordingly, by improving the tensile modulus of a film, surface hardness, and/or toughness may also be improved.

As described above, a film according to an embodiment may be prepared by including an asymmetric diamine having an amide group and two phenylene groups, of which only one phenylene group is substituted by a substituent, such as, for example, an electron-withdrawing group. Accordingly, a poly(amide-imide) film includes a polymer having a higher content of amide groups, which provides the film with improved mechanical properties. At the same time, the film has a reduced refractive index. Accordingly, film according to an embodiment, and prepared from the poly(amide-imide) copolymer, may have enhanced mechanical properties as well as improved optical properties. Therefore, the poly(amide-imide) copolymer according to an embodiment having improved optical and mechanical properties may advantageously be used for a protective or window film of a display device that requires greatly improved mechanical and optical properties.

While this disclosure has been described in connection with what is presently considered to be practical exemplary embodiments, it is to be understood that the present disclosure is not limited to the embodiments presented herein, but, on the contrary, is intended to cover various modifications and equivalent arrangements included within the spirit and scope of the appended claims.

What is claimed is:

1. A poly(amide-imide) copolymer that is a reaction product of;
   a diamine comprising a compound represented by Chemical Formula 1,
   a tetracarboxylic acid dianhydride comprising a compound represented by Chemical Formula 2, and
   a compound represented by Chemical Formula 3:

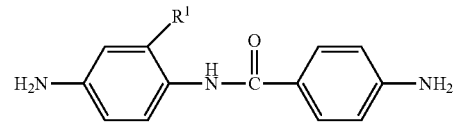

Chemical Formula 1 wherein in Chemical Formula 1,
$R^1$ is a halogen-substituted C1 to C10 alkyl group;

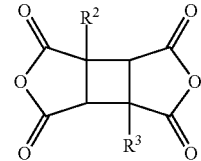

Chemical Formula 2 wherein in Chemical Formula 2,
$R^2$ and $R^3$ are each independently hydrogen, or a halogen-substituted or an unsubstituted C1 to C10 alkyl group;

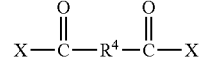

Chemical Formula 3 wherein, in Chemical Formula 3,
$R^4$ is a substituted or unsubstituted phenylene group or a substituted or unsubstituted biphenylene group, and
each X is an identical or a different halogen atom.

2. The poly(amide-imide) copolymer according to claim 1, wherein the diamine further comprises a compound represented by Chemical Formula 4:

NH$_2$-A-NH$_2$   Chemical Formula 4 wherein in Chemical Formula 4,
A is a ring system including two or more C6 to C30 aromatic rings linked by a single bond, wherein each of the two or more aromatic rings is independently unsubstituted or substituted with an electron-withdrawing group.

3. The poly(amide-imide) copolymer according to claim 1, wherein the tetracarboxylic acid dianhydride further comprises a compound represented by Chemical Formula 5:

Chemical Formula 5

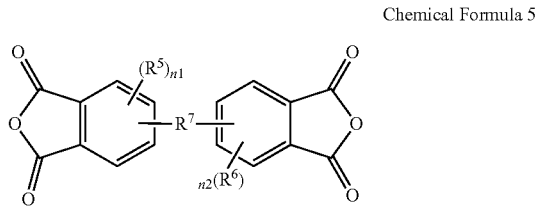

wherein, in Chemical Formula 5,

R⁵ and R⁶ are each independently a halogen, a hydroxy group, a substituted or unsubstituted C1 to C10 aliphatic organic group, a substituted or unsubstituted C6 to C20 aromatic organic group, a group of formula —OR²⁰¹, wherein R²⁰¹ is a C1 to C10 aliphatic organic group, or a silyl group of formula —SiR²¹⁰R²¹¹R²¹², wherein R²¹⁰, R²¹¹, and R²¹² are each independently hydrogen or a C1 to C10 aliphatic organic group, and R⁷ is a single bond, —O—, —S—, —C(=O)—, —CH(OH)—, —C(=O)NH—, —S(=O)₂—, —Si(CH₃)₂—, —(CH₂)$_p$—, —(CF₂)$_q$—, —C(C$_n$H$_{2n+1}$)₂—, —C(C$_n$F$_{2n+1}$)₂—, —(CH₂)$_p$C(C$_n$H$_{2n+1}$)₂(CH₂)$_q$—, or —(CH₂)$_p$C(C$_n$F$_{2n+1}$)₂(CH₂)$_q$— wherein 1≤n≤10, 1≤p≤10, and 1≤q≤10, and n1 and n2 are each independently an integer ranging from 0 to 3.

4. The poly(amide-imide) copolymer according to claim 1, wherein in Chemical Formula 1, R¹ is a fluoro-substituted C1 to C4 alkyl group.

5. The poly(amide-imide) copolymer according to claim 1, wherein in Chemical Formula 2, R² and R³ are each independently hydrogen, or a fluoro-substituted or unsubstituted C1 to C4 alkyl group.

6. The poly(amide-imide) copolymer according to claim 2, wherein in Chemical Formula 4, A is a ring system comprising two C6 to C14 aromatic rings linked by a single bond, wherein each of the two or more aromatic rings are independently substituted with a halogen atom, a nitro group, a cyano group, a C1- or C2-haloalkyl group, a C2- to C6-alkanoyl group, or a C2 to C6 acyloxy group.

7. The poly(amide-imide) copolymer according to claim 2, wherein the compound represented by Chemical Formula 4 is represented by one or more of the following chemical formulae:

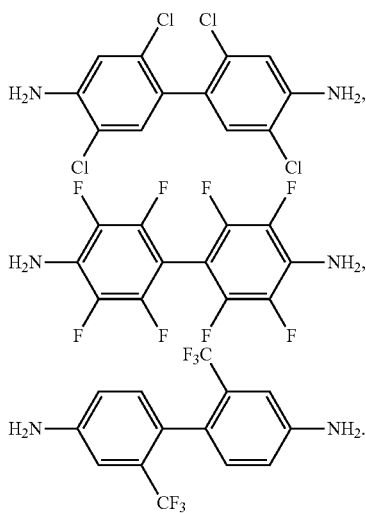

8. The poly(amide-imide) copolymer according to claim 3, wherein in Chemical Formula 5, n1 and n2 are both zero, and R⁷ is —O—, —S—, —C(=O)—, —CH(OH)—, —C(=O)NH—, —S(=O)₂—, —Si(CH₃)₂—, —(CH₂)$_p$—, —(CF₂)$_q$—, —C(C$_n$H$_{2n+1}$)₂—, —C(C$_n$F$_{2n+1}$)₂—, —(CH₂)$_p$C(C$_n$H$_{2n+1}$)₂(CH₂)$_q$—, or —(CH₂)$_p$C(C$_n$F$_{2n+1}$)₂(CH₂)$_q$— wherein 1≤n≤10, 1≤p≤10, and 1≤q≤10).

9. The poly(amide-imide) copolymer according to claim 3, wherein in Chemical Formula 5, n1 and n2 are both be zero, and R⁷ is —O—, —S—, —C(=O)—, —CH(OH)—, —C(=O)NH—, —S(=O)₂—, or —C(C$_n$F$_{2n+1}$)₂ (wherein 1≤n≤3).

10. The poly(amide-imide) copolymer according to claim 1, in Chemical Formula 3, R⁴ is an unsubstituted phenylene group, and each X is Cl.

11. The poly(amide-imide) copolymer according to claim 1, wherein the compound represented by Chemical Formula 1 is included in an amount of less than or equal to 55 mole percent based on a total mole number of the diamine.

12. The poly(amide-imide) copolymer according to claim 1, wherein the compound represented by Chemical Formula 2 is included in an amount of greater than or equal to about 30 mole percent and less than or equal to about 70 mole percent based on a total mole number of the tetracarboxylic acid dianhydride.

13. The poly(amide-imide) copolymer according to claim 1, wherein the tetracarboxylic acid dianhydride is included in an amount of greater than or equal to about 25 mole percent and less than or equal to about 90 mole percent based on a total mole number of the tetracarboxylic acid dianhydride and the compound represented by Chemical Formula 3.

14. A composition for preparing a poly(amide-imide) copolymer comprising a compound represented by Chemical Formula 1, a compound represented by Chemical Formula 2, and a compound represented by Chemical Formula 6:

Chemical Formula 1

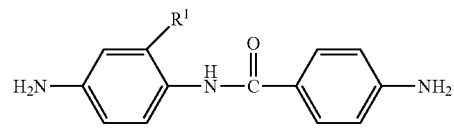

wherein in Chemical Formula 1,
R¹ is a halogen-substituted C1 to C10 alkyl group;

Chemical Formula 2

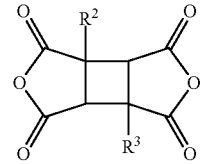

wherein in Chemical Formula 2,
R² and R³ are each independently hydrogen, or a halogen-substituted or an unsubstituted C1 to C10 alkyl group;

Chemical Formula 6

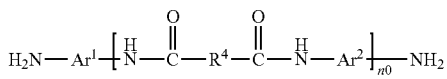

wherein, in Chemical Formula 6, n0 is an integer of greater than or equal to 1, $R^4$ is a substituted or unsubstituted phenylene group or a substituted or unsubstituted biphenylene group, and $Ar^1$ and $Ar^2$ are, each independently, represented by Chemical Formula 7:

Chemical Formula 7

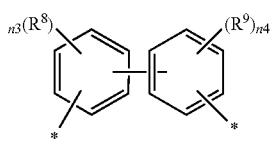

wherein, in Chemical Formula 7, $R^8$ and $R^9$ are each independently —$CF_3$, —$CCl_3$, —$CBr_3$, —$Cl_3$, —$NO_2$, —CN, —C(=O)$CH_3$, and —$CO_2C_2H_5$, and n3 and n4 are each independently an integer ranging from 1 to 4.

15. The composition for preparing a poly(amide-imide) copolymer according to claim 14, wherein the composition further comprises a compound represented by Chemical Formula 5:

Chemical Formula 5

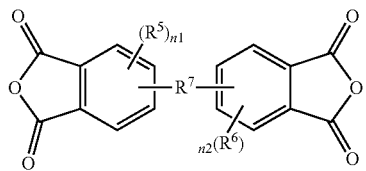

wherein, in Chemical Formula 5, $R^5$ and $R^6$ are each independently a halogen, a hydroxy group, a substituted or unsubstituted C1 to C10 aliphatic organic group, a substituted or unsubstituted C6 to C20 aromatic organic group, a group of formula —$OR^{201}$, wherein $R^{201}$ is a C1 to C10 aliphatic organic group, or a silyl group of formula —$SiR^{210}R^{211}R^{212}$, wherein $R^{210}$, $R^{211}$, and $R^{212}$ are each independently hydrogen or a C1 to C10 aliphatic organic group, $R^7$ is a single bond, —O—, —S—, —C(=)—, —CH(OH)—, —C(=O)NH—, —S(=O)$_2$—, —Si($CH_3$)$_2$—, —($CH_2$)$_p$—, —($CF_2$)$_q$—, —C($C_nH_{2n+1}$)$_2$—, —C($C_nF_{2n+1}$)$_2$—, —($CH_2$)$_p$C($C_nH_{2n+1}$)$_2$($CH_2$)$_q$—, or —($CH_2$)$_p$C($C_nF_{2n+1}$)$_2$($CH_2$)$_q$— wherein 1≤n≤10, 1≤p≤10, and 1≤q≤10, and n1 and n2 are each independently an integer ranging from 0 to 3.

16. The composition for preparing a poly(amide-imide) copolymer according to claim 14, wherein the composition further comprises a compound represented by Chemical Formula 4:

$NH_2$-A-$NH_2$        Chemical Formula 4 wherein in Chemical Formula 4,

A is a ring system including two C6 to C30 aromatic rings linked by a single bond, wherein the two C6 to C30 aromatic rings is independently substituted with a halogen atom, a nitro group, a cyano group, a C1- or C2-haloalkyl group, a C2- to C6-alkanoyl group, or a C2 to C6 acyloxy group.

17. The composition for preparing a poly(amide-imide) copolymer according to claim 14, wherein $R^1$ of Chemical Formula 1 is a fluoro-substituted C1 to C4 alkyl group, $R^2$ and $R^3$ of Chemical Formula 2 are each independently hydrogen, or a fluoro-substituted or unsubstituted C1 to C4 alkyl group, $R^4$ of Chemical Formula 6 is an unsubstituted phenylene group, $R^8$ and $R^9$ of Chemical Formula 7 are each independently —$CF_3$ or —$CCl_3$, and n3 and n4 are each 1.

18. An article comprising a poly(amide-imide) copolymer according to claim 1.

19. The article according to claim 18, wherein the article comprises a film, wherein the film has a tensile modulus of greater than or equal to 5 GPa, as measured according to ASTM D882, and a refractive index of less than 1.7, measured by using an Ellipsometer in a visible light region at 550 nanometer established by the Gen-Osc model.

20. A display device comprising the article according to claim 18.

* * * * *